Nov. 28, 1950  S. J. EVERETT  2,532,091
THERMOPLASTIC TUBE FORMING APPARATUS
Filed Feb. 13, 1948  5 Sheets-Sheet 1
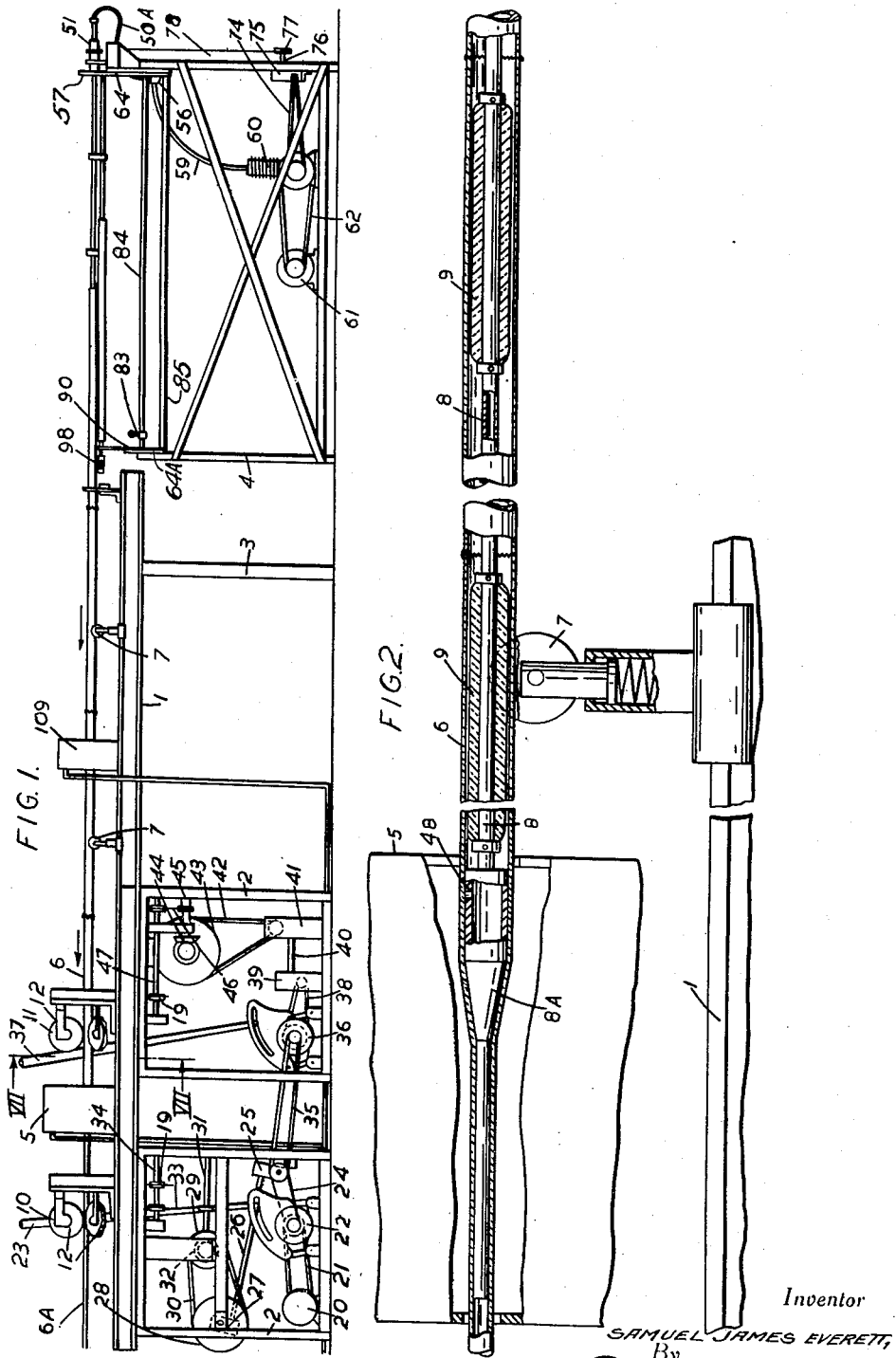
Inventor
SAMUEL JAMES EVERETT,
By
Robert B Larson
Attorney

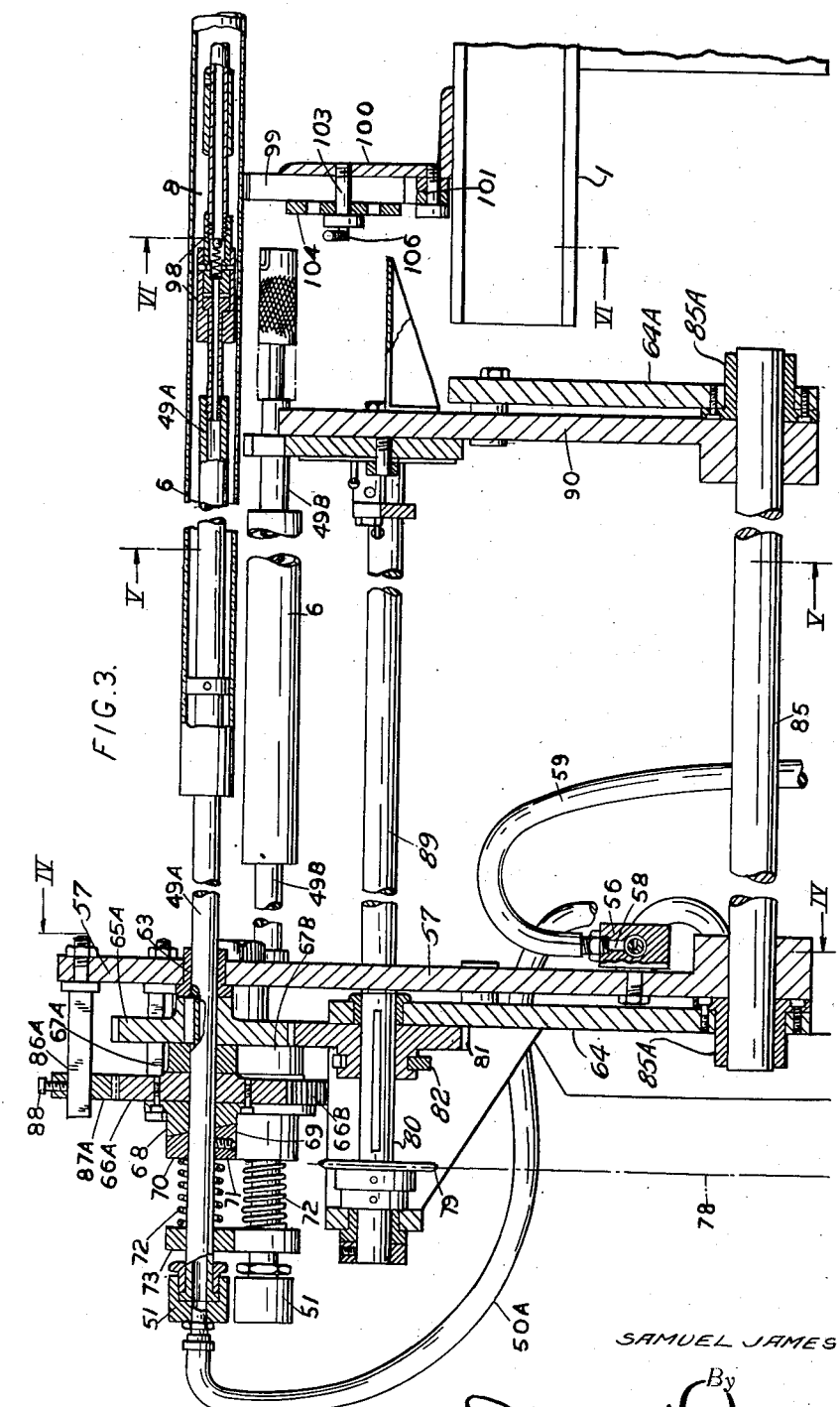

Nov. 28, 1950 S. J. EVERETT 2,532,091
THERMOPLASTIC TUBE FORMING APPARATUS
Filed Feb. 13, 1948 5 Sheets-Sheet 3
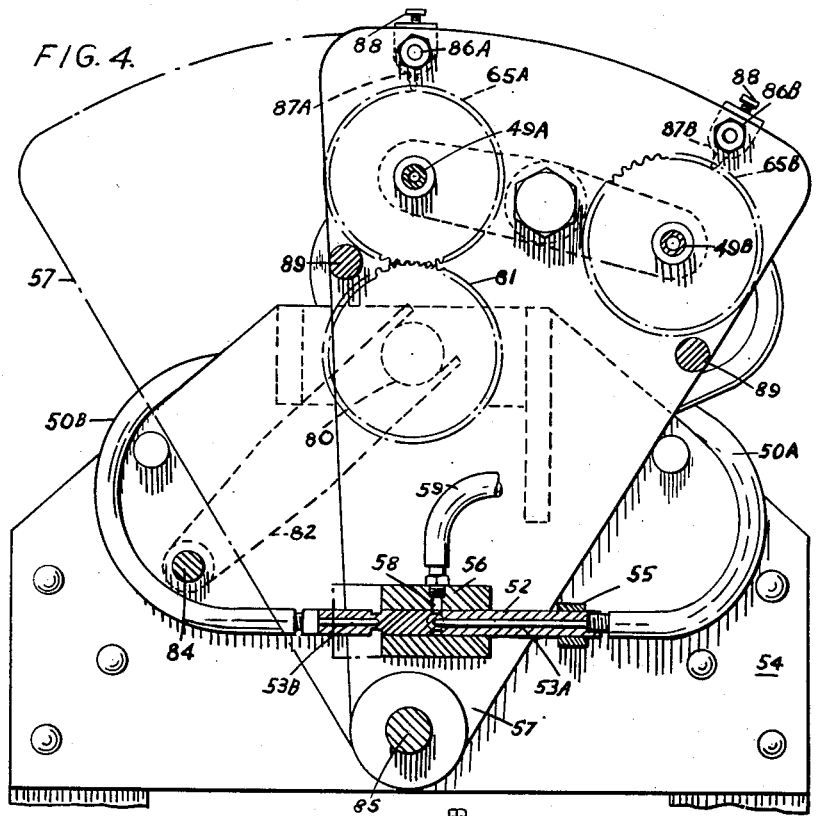
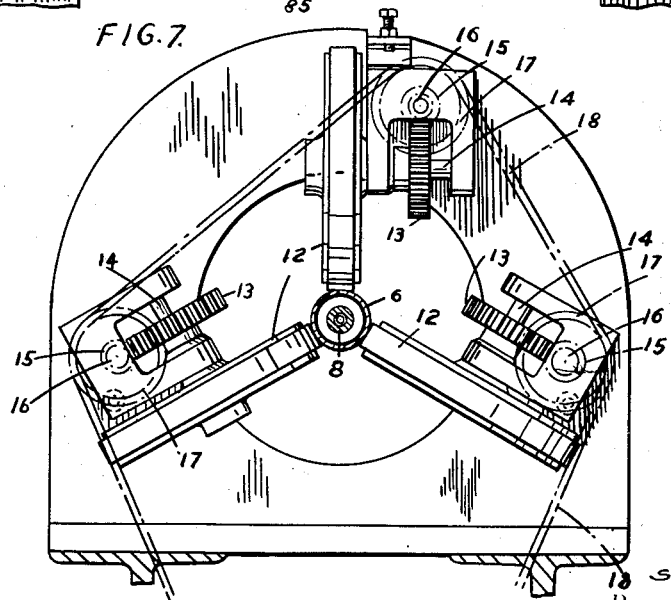
Inventor
SAMUEL JAMES EVERETT,
By Robert B Larson Attorney

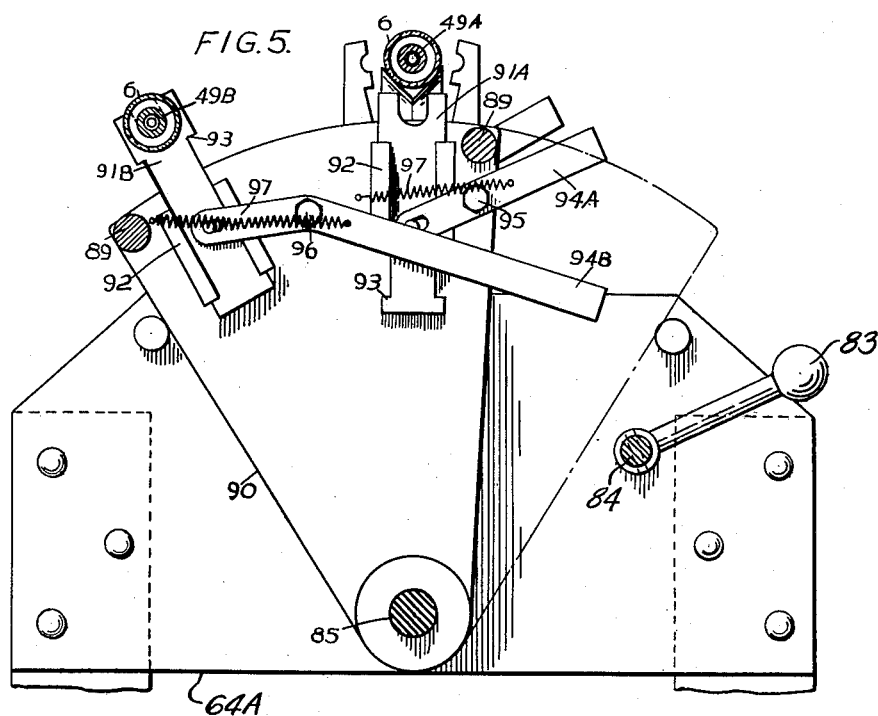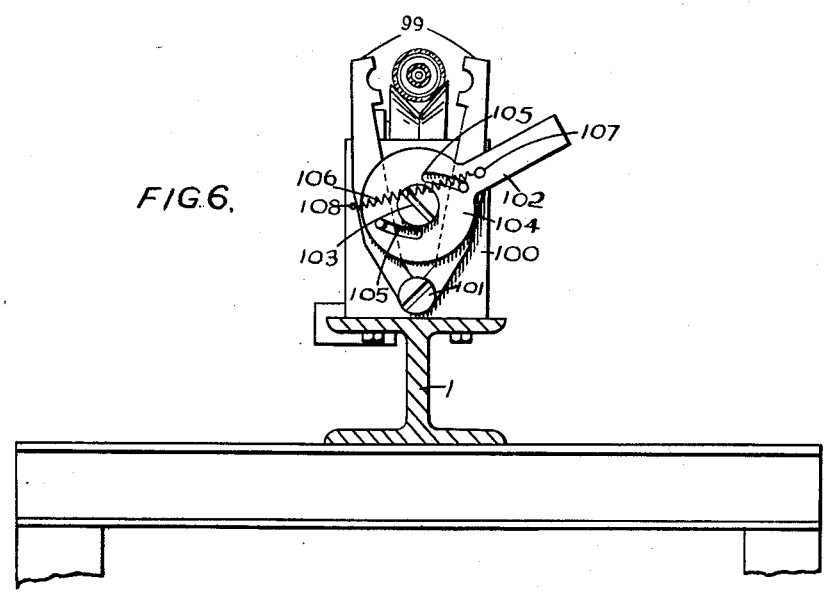

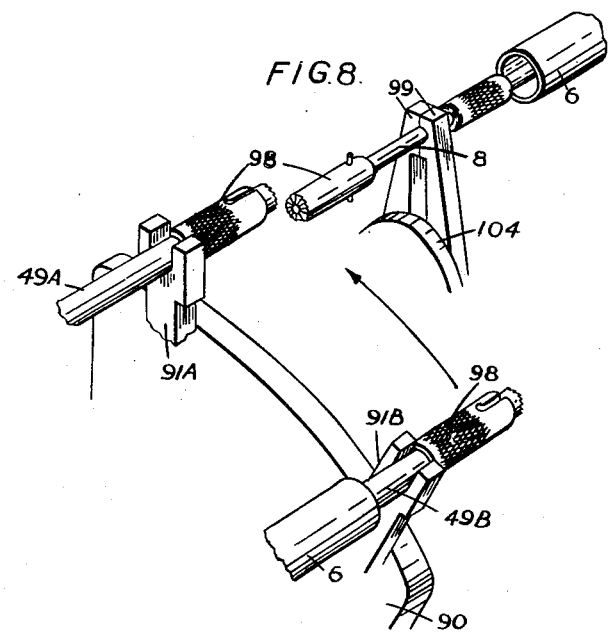

Patented Nov. 28, 1950

2,532,091

UNITED STATES PATENT OFFICE 2,532,091

THERMOPLASTIC TUBE FORMING APPARATUS

Samuel James Everett, Thornton Heath, England

Application February 13, 1948, Serial No. 8,023
In Great Britain February 18, 1947

13 Claims. (Cl. 49—7)

This invention relates to the manufacture of tubes of glass and other thermoplastic materials by a process of stretching tubular material in the softened condition over an accurately formed mandrel. By that process, tubes can be formed with surfaces which are absolutely true and smooth and with a fine quality finish which can be obtained by grinding and lapping or polishing the surface.

A method of manufacturing tubes by the said process is described in Patent No. 2,393,979, dated February 5, 1946, in which commercial glass cane is passed over a stationary or rotating mandrel which is located in a heating zone and which might be slightly tapered in the direction of movement of the tube to enable the latter to be more easily drawn off the mandrel.

The tube is gripped by slidable chucks at the inlet and outlet ends so that the bore of the finished tube is controlled by the shape and size of the mandrel and the weight per foot of the finished tube is controlled by the relative speed of the two chucks. In order to cause the tube to conform accurately to the outside of the mandrel, air can be evacuated from the tube so that the pressure of the surrounding atmosphere is exerted on the outside of the tube.

In patent application Serial No. 735,345, filed March 18, 1947, a development is described in which a definitely tapered mandrel is used to enable various sizes of finished tubes to be produced from large size glass cane, and the mandrel may have two parallel portions connected by an intermediate tapered portion. Also, a further development set forth in said patent application consists in using a mandrel in which the parallel portions are of different shapes in cross-section so that for example, a tube of angular section or of oval section can be drawn from standard circular glass cane. Furthermore, the mandrel can be rapidly reciprocated instead of, or in addition to, being rotated since in producing a non-circular tube, the mandrel cannot be rotated, and moreover, the reciprocating movement assists in eliminating imperfections and lines in the finished tube and in improving the accuracy of the bore.

Up to the present, therefore, the method has suffered from the disadvantage of producing a certain length of scrap at either end of each length of glass owing to the necessity of gripping a portion at each end which is not treated in the process. So far this has been inherent in the process partly because of the necessity of gripping the tube as mentioned and partly because of the desirability of creating a partial vacuum within the tube and also partly from the difficulty of threading the individual glass canes on to the mandrel rod which is an extension of the mandrel proper and through which the rotating or reciprocating movement of the mandrel is conveyed.

The main object of the present invention is to render the process continuous, that is to say, to enable the process to be carried out without stopping at all or for only very short periods from time to time, and on the other hand, to enable the lengths of raw tube to be fed in, and successive lengths to be fused end to end and thereby incidentally effectively utilising the whole of the raw tube of glass or other material.

The invention is especially concerned with the rearwardly extending mandrel rod and its operating mechanism with the purpose of enabling a series of lengths of raw tubing to be fed in and connected without stopping the process for appreciable lengths of time; to that end, according to the invention, the mandrel is provided with a form of easily detachable coupling at its rear end and also one or more rearwardly extending mandrel operating rods is provided to the rear of that coupling arranged to be readily connected to and disconnected from the mandrel by means of that coupling. Conveniently two such mandrel operating rods may be utilised preferably set parallel to one another and mounted on a support arranged to be rocked about a pivoted axis well to the rear of the heating zone or furnace so that after uncoupling one of the mandrel rods, the other can be rocked into registration with the rear end of the mandrel proper after a length of raw tube has been threaded on to it and then quickly coupled up to the mandrel.

While one of the operating rods is in operation, the forward end of the other is made free by withdrawing downwardly from it a supporting bracket whereupon a length of raw glass or other tube can be threaded over it from the front and the supporting bracket restored in readiness for coupling up for bringing that length of tube into operation. At the proper time, the mandrel rod in operation is disconnected and the one bearing the fresh length of tubing is swung into registration and coupled up and the fresh length of tube at its forward end is fused to the rear end of the tube previously used by a movable electric furnace or cross blow pipe. If desired, a hose connection may be provided for supplying compressed air to the inside of the tube through a hand-controlled valve while the fused joint is still heated to ensure that the tubes are of the correct size at the joint.

Sliding chucks as referred to above obviously cannot be used for such continuous operation but instead continuous feeding means are employed which feed the raw tubes and the finished tubes continuously; for this purpose, feed rollers resiliently gripping the tubes may be employed. Thus three such rollers may be provided at the inlet end and three at the outlet end spaced around the tube 120 degrees apart. As an alternative, at each point the feeding device may consist of two or more endless bands pressed into engagement with the tubes and continuously driven. Generally, the feed at the outlet end has to be at a higher rate than at the inlet end and the relative speed of the feed needs to be adjustable to enable the weight per foot of the finished tube to be adjusted. This can be arranged by driving one feed device at constant speed and the other through an infinitely variable gearing or both may be driven through such a gearing.

The mandrel operating rods are tubular and each is provided with a flexible hose connection to a vacuum pump at or near its rear end so that air can be drawn from the glass tubes through a port in the mandrel to the rear of the furnace and through the mandrel which is also tubular. The vacuum pump is connected to the two flexible hose connections through a slide valve which is operated by the pivotally-mounted support so that the pump is at any time in connection with the bore of the mandrel rod in operation while the other mandrel rod is cut off from the pump. The mandrel rods may have twin bores serving as vacuum connection and feed for lubricant to the mandrel respectively but it is found that successful results are obtained by applying lubricant to the operative surface of the mandrel from time to time without any lubricant feed pipe.

The mandrel rod in operation may be continuously rotated or axially reciprocated or both. Conveniently, each mandrel rod has a spur wheel fixed to it near its rear end and a spur pinion on a driving shaft below the mandrel rod is arranged to drive the mandrel rod in operation at any time. When a mandrel rod is brought into the operating position by rocking its support, its spur wheel is brought into mesh with the driving pinion and the spur wheel of the other mandrel rod moved out of mesh with the driving pinion. A second spur wheel is carried on each mandrel rod slightly to the rear of the spur wheel mentioned above but is free to turn on the mandrel rod and is constrained from axial movement on the rod. The two pairs of spur wheels are of the same size so that by sliding the driving shaft and the driving pinion somewhat to the rear, the driving pinion is brought into mesh with the loose spur wheel on the mandrel rod in operation which it rotates without rotating the mandrel rod. Each of the loose spur wheels is formed with an integral cylindrical end cam extending backwards from the spur wheel. The rear cam face of each cylindrical cam coacts with a cam face formed on the front end of a cylindrical cam splined to slide on the respective mandrel rod and held up to the cooperating cam by a coiled compression spring encircling the mandrel rod and bearing at its rear end against a stationary abutment on the machine frame. Each of the four spur wheels can be held against rotation by a manually operated sprag which can be caused to engage the teeth of the spur wheel in question.

Thus there are three conditions any one of which may be selected. First, if the driving pinion is engaged with the front fast spur wheel on the mandrel rod in operation and the rear loose spur wheel on that rod is locked by means of its sprag, the mandrel rod is continuously rotated and is also continuously reciprocated by interaction of its two cylindrical cams of which that integral with the loose spur wheel is held against rotation. Secondly, if the driving pinion is engaged with the rear loose spur wheel and the front fast spur wheel is locked against rotation by means of its sprag, the rod is prevented from rotation and is reciprocated only. Thirdly, if both sprags are withdrawn, the cams are rendered ineffective and if the front spur wheel is engaged with the driving pinion the mandrel rod is continuously rotated but is not reciprocated.

Instead of providing a separate cam for each rod, the two rods may be connected by a transverse bar and a single cam may reciprocate both of them.

In order that the invention may be clearly understood and readily carried into effect, a machine in accordance therewith will now be more fully described, by way of example, with reference to the accompanying drawings, in which:

Figure 1 is a side elevation of the complete machine;

Figure 2 is a side elevation to an enlarged scale with certain parts broken away, of the glass tube and mandrel in the furnace;

Figure 3 is a side elevation of the rear part of the machine, seen from the opposite side to Figure 1;

Figure 4 is an elevation in transverse section on the line IV—IV in Figure 3;

Figure 5 is a similar view in section on the line V—V in Figure 3;

Figure 6 is yet a further similar view in section on the line VI—VI in Figure 3;

Figure 7 is a transverse section to an enlarged scale on the line VII—VII in Figure 1, and Figure 8 is a detailed perspective view showing the support and coupling arrangements for the mandrel operating rods.

Referring first to Figure 1, the framework of the machine comprises a front bed 1 of I section supported on box frames 2 and a column 3 while there is a rear braced frame 4. The bed 1 supports a small furnace 5 which provides the heating zone for the glass tubing 6. The latter is carried on spring-supported rollers 7 and encircles the mandrel 8. The mandrel is a tubular rod of refractory metal to which are secured spaced carbon rods 9 which fit the glass tube 6 and thus serve to centralize the mandrel proper 8. The glass tube 6 is drawn through the furnace 5 and over the mandrel 8 by a front feeding device 10 and rear feeding device 11. The two devices are similar except that the feed rollers 12 of the device 10 have their rims closer together than those of the device 11 because the former grip the reduced tube 6A while the latter grip the tube 6 before it is reduced. The feeding device 11 is seen in detail in Figure 7 from which it will be observed that there are three feed rollers 12 with their central planes uniformly spaced at 120 degrees around the glass tube 6 which is gripped by the rims of the rollers. The rollers 12 are rotated at equal speeds to advance the tube 6 into the furnace 5 by means of gearing each consisting of a worm wheel 13 on the spindle 14 of the respective roller 12 driven by a worm 15. On the spindle 16 of each worm 15 is secured a chain sprocket 17. The sprockets 17 are equal and are all driven by the same roller chain 18, itself driven from a sprocket 19 (Figure 1). In order to draw down the softened tube 6 to the mandrel 8, the feed device 10 is driven at a greater speed than the device 11. The drive for both is derived from an electric motor 20 connected by a belt 21 to an expansible pulley infinitely variable gearing 22, the flanges of the pulley being moved together or apart by a lever 23. Th gearing 22 is connected by a belt 24 to a 15 to 1 reduction gearing 25 which, in turn is connected by a shaft 26 to a further 15 to 1 reduction gearing 27. The latter is connected by pulleys 28, 29 and a belt 30 to a transverse shaft which drives a longitudinal shaft 31 through bevel gearing 32. The shaft 31 is connected by a chain 33 to the shaft 34 to which the sprocket 19 is secured. Thus the feed rollers 12 of the feed device 10 are driven at slow speed which may be adjusted by the lever 23.

A belt 35 connects the reduction gearing 25 to a second expansible pulley infinitely variable gearing 36 whose pulley is adjusted by the hand lever 37. This gearing is connected by a belt 38 to a 15 to 1 reduction gearing 39 connected in turn by a shaft 40 to another 15 to 1 reduction gearing 41. The drive is then carried through a belt 42 to a pulley 43 and thence through bevel gearing 44 to a longitudinal shaft 45 connected by a chain 46 to the shaft 47 carrying the other chain sprocket 19. Thus the feed rollers 12 of the feed device 11 are driven at a considerably lower speed than those of the device 10: their speed can be adjusted with that of the device 10 by the gearing 22 and independently by the variable gearing 36.

The nose 8A of the mandrel 8 is tapered as set forth in said patent application Serial No. 735,345 so that a large tube 6 can be drawn down to a fine bore and to prevent sticking, the mandrel may be coated thinly with graphite or other lubricant before beginning to work. The inside of the tube 6 is evacuated for which purpose, the mandrel 8 is tubular and is formed with a port 48 in its wall as seen in Figure 2. The suction is thus applied through the mandrel 8 and through the mandrel operating rod 49A or 49B coupled to the rear end of the mandrel 8 as seen in Figure 3. Each of these rods 49A, 49B has a hose connection 50A, 50B coupled to its rear end by means of a detachable clip or union 51 (Figure 3). The two connections 50A, 50B are carried to the plug 52 of a slide valve (Figure 4) which has a bore 53A, 53B from each end. The plug 52 is fixed to the plate 64 of the frame 54 by a clip 55 but the outer valve casing 56 is carried by the rocking support 57 for the mandrel rods which will be described more fully below. The rocking support 57 is a sector-shaped plate fixed to a pivot spindle 85 which is journalled in bearings 85A in the back and front plates 64, 64A of the braced frame 4. In Figures 3 and 4, the mandrel rod 49A is shown in the operating position and the rod 49B out of operation. The connection 50A from the rod 49A is in communication through the bore 53A with a port 58 in the valve casing 56 and thence to a flexible hose connector 59 leading to the vacuum pump 60 (Figure 1). The pump 60 is driven by an electric motor 61 through a belt 62. In the position described, the connection 50B is cut off from the pump 60 but if the support 57 is swung counterclockwise as seen in Figure 4 to the position shown in dotted lines to bring the mandrel rod 49B into operation, the valve body 56 is also moved over to connect the hose 50B to the pump 60 and to cut off the connection to the hose 50A.

The mandrel operating rods 49A, 49B are arranged so that they can be continuously rotated, or continuously reciprocated in the direction of their axes or they can receive both forms of motion simultaneously. They are rotatably mounted in bushes 63 in the rocking support plate 57. Each rod 49A, 49B has a spur wheel 65A, 65B slidably splined to it and each has a rear spur wheel 66A, 66B loosely mounted on it but prevented from axial movement to the right in Figure 3 by a spacing collar 67A, 67B between it and the other spur wheel 65A, 65B. Each loose spur wheel 66A, 66B has a cylindrical cam 68 secured to it. Each cam has an inclined end face 69 cooperating with a corresponding end face of a further cam 70 having a set screw 71 which causes it to rotate with the mandrel rod 49A, 49B but permits the cam 70 to be pressed against the cam 68 by a coiled compression spring 72 which at its rear end bears against a fixed plate 73.

The drive for the mandrel rods 49A, 49B is provided by the electric motor 61, a belt 74 connecting the pulley of the pump 60 to a 15 to 1 reduction gearing 75 (Figure 1). The output spindle 76 of the gearing 75 bears a chain sprocket 77 connected by a chain 78 to a sprocket 79 on a longitudinal horizontal shaft 80. A driving pinion 81 is slidably splined to the shaft 80 and can be shifted axially along the shaft by a fork 82 operated by a handle 83 (Fig. 1) on a sliding rod 84 so as to bring the pinion 81 into position to engage one of the spur wheels 65A, 65B or one of the wheels 66A, 66B. In Figures 3 and 4, the pinion 81 is shown in engagement with the spur wheel 65A but by swinging the support 57 counterclockwise about its pivot 85 into the position shown in broken lines in Figure 4, the spur wheel 65B is brought into driving connection with the pinion 81. By sliding the pinion 81 to the left in Figure 3, it can similarly be made to engage with the spur wheel 66A or 66B. Two rearwardly extending bars 86A, 86B are fixed to the support plate 57 and a sprag 87A, 87B is slidable on the bar 86A, 86B and can be secured by a set-screw 88 in position to engage the spur wheel 65A, 66A or 65B, 66B and thereby lock the same against rotation.

This mechanism makes it possible for the mandrel rod 49A, 49B which is in operation to be continuously rotated, continuously reciprocated axially or both. Thus, if the front spur wheel 65A, 65B is in engagement with the pinion 81, the corresponding mandrel rod 49A, 49B is continuously rotated and if the rear loose spur wheel 66A, 66B is held by the sprag 87A, 87B, the cam 70 is reciprocated and reciprocates the mandrel rod. If, however, the rear loose spur wheel is left free, the mandrel rod is rotated but not reciprocated. Finally, if the pinion 81 is shifted to drive one of the loose wheels 66A, 66B, and the front spur wheel 65A, 65B is locked by the sprag 87A, 87B, the mandrel rod is reciprocated by the cam 70 but is not rotated. Sticking of the glass tube 6 to the mandrel is thus effectively prevented.

The support plate 57 is connected by rods 89 to a further plate 90 which is also fixed to the pivot spindle and is thus also turned about the pivot when bringing one of the mandrel rods 49A, 49B into operation and moving the other out of the operating position. The plate 90 carries a pair of radial sliding brackets 91A, 91B. They slide in guides 92 secured to the plate 90, the amount of movement being limited by stop shoulders 93. The brackets are actuated by hand levers 94A, 94B pivoted at 95, 96 and provided with tension springs 97 which move over-centre and thus act to hold the brackets in the outer and inner positions. The brackets support the forward ends of the mandrel rods 49A, 49B and when a bracket is moved out and the plate 90 rocked over, one of the mandrel rods is brought into alignment with the mandrel 8 as shown for the rod 49A in Figures 3 and 5. If the bracket 91B is moved inwards, the forward end of the rod 49B is left free and a fresh length of glass tube 6 can be slipped over the rod from the front in readiness for the next change-over.

The abutting ends of the mandrel 8 and the rod 49A, 49B are fitted with quick detachable bayonet unions 98 as best seen in Figures 3 and 8. These afford a driving coupling for transmitting rotation and reciprocation from the mandrel rod 49A, 49B to the mandrel and also a tight union for the vacuum passage to the mandrel.

During the change-over period illustrated in Figure 8, it is desirable to support the rear end of the mandrel proper 8. For this purpose, a pair of pivoted jaws 99 is provided shown in detail in Figure 6. They are pivoted on a bracket plate 100 secured by screws to the bed member 1, the pivot being indicated at 101. A hand lever 102 is provided to operate the jaws and turns about a pivot screw 103. The lever 102 has a central expanded part 104 formed with two curved cam slots 105 so that the jaws 99 are opened or closed as the lever 102 is turned. An over-centre tension spring 106 is attached to the lever 102 at 107 and at its other end at 108 is anchored to the bracket 100 and thus tends to hold the lever 102 in the open or closed position. The jaws 99 are closed to hold the mandrel during the change-over but when the rod 49A, 49B bearing the fresh length of glass tube 6 is coupled up at 98, the jaws 99 are opened to allow the glass tube 6 to be moved forwardly over the mandrel 8 to be fused on to the end of the previous length of glass tube. This fusing operation may be effected by a gas heater shown diagrammatically at 109 in Figure 1.

The method of using the machine is as follows: Standard lengths of glass cane are employed, lengths of suitable size are selected and checked to ensure that they conform to the permitted limits of weight per foot length and the ends are carefully squared off. With the coupling 98 disconnected and the jaws 99 open, a length of cane is passed forwardly over the mandrel 8, through the rear feeding device 11 and furnace 5 into the front feeding device 10. One of the mandrel operating rods 49A, 49B is coupled up to the mandrel 8 at 98 and the process started with the motors 20 and 61 running so that the glass tube is under vacuum. The driving gearing at the rear end of the mandrel rod is set to provide for continuous rotation, reciprocation or both as desired. The mandrel rod not in use, say the rod 49B, has its supporting bracket 91B moved inwardly so as to leave the forward end of that rod free. Another length of glass cane is then threaded over the rod 49B from the front end in readiness. When the rear end of the length of glass cane being operated upon reaches a predetermined point, for instance, at the gas heater 109, the mandrel rod 49A is uncoupled at 98, its supporting bracket 91A moved out into engagement and the bracket 91B of the reserve mandrel rod 49B moved out to support the latter; the frame comprising the supporting plates 57 and 90 is rocked over to bring the rod 49B into alignment with the mandrel 8 and is coupled to it. Then with the jaws 99 open, the fresh length of glass cane 6 is moved forwardly over the mandrel and fused on to the previous length by the heater 109. The process then proceeds while still another length of glass cane can be threaded on to the mandrel rod 49A which is now in reserve and that length is in readiness to be fused on to the preceding length in due course.

Naturally with the machine as described, there is a short period when one mandrel rod is uncoupled and the other rod coupled up, during which the mandrel 8 is not driven and the process is stopped. It is found, however, that a skilled operator can make the change-over in about three seconds and the loss of time is negligible and does not lead to any trouble in the process.

I claim:

1. An apparatus for forming tubes of thermoplastic material with bores of accurate dimensions and fine quality finish comprising in combination, a supporting frame, a furnace for heating a length of thermoplastic tubing carried on said frame, means for feeding said tubing into said furnace and supported on said frame, means for drawing said tubing from said furnace and supported on said frame, means for driving said feeding and drawing means, variable speed gearing for regulating the relative speeds of said feeding and drawing means, a mandrel extending into said furnace, a mandrel rod extending rearwardly from said mandrel, a readily detachable coupling engaging said mandrel and said rod for providing a driving connection therebetween, an actuating member in operative connection with said mandrel rod to maintain said rod and said mandrel in continuous motion a rod support to the rear of said mandrel and means providing for transverse movement of said rod support relative to said mandrel.

2. An apparatus for forming tubes of thermoplastic material with bores of accurate dimensions and fine quality finish comprising in combination, a supporting frame, a furnace for heating a length of thermoplastic tubing carried on said frame, means for feeding said tubing into said furnace and supported on said frame, means for drawing said tubing from said furnace and supported on said frame, means for driving said feeding and drawing means, variable speed gearing for regulating the relative speeds of said feeding and drawing means, a mandrel extending into said furnace, a plurality of mandrel operating rods, readily detachable connections for connecting each rod to said mandrel to provide a driving connection therebetween, rod driving means for imparting continuous rod motion, a rod support to the rear of said mandrel, and means providing for transverse movement of said rod support relative to said mandrel so as to bring said rods selectively into operating position in alignment with said mandrel.

3. An apparatus according to claim 2, said rod support being capable of rocking movement relative to said mandrel, said mandrel operating rods being two in number and positioned parallel to each other.

4. An apparatus according to claim 2, extendable and retractable rod supporting brackets carried by said support, said brackets being arranged to leave one end of a rod free for the reception of a fresh tube when the rod is not in operating position and the bracket carrying said rod is retracted, and to bring a rod into alignment with the mandrel for coupling to the mandrel when in extended position, after which the brackets can be retracted to free the rod from the support.

5. An apparatus according to claim 1, in which said tube feeding means consists of a set of feed rolls for feeding a tube under treatment into the furnace and a separate similar set of rolls for withdrawing the tube from the furnace, whereby continuous feeding may be accomplished, and drive means for said feed rolls including variable speed gearing means for determining the speed of operation of both sets of rolls, and another variable speed gearing means for one set of rolls to permit independent adjustment of the speed of said one set.

6. An apparatus according to claim 2, actuating mechanism carried by said rods near their rear ends, and means controlling operation of said mechanism in accordance with the position of said rod support to cause actuation of said rods when they are in operating position.

7. An apparatus according to claim 2, a driving pinion, and a gear wheel on each rod positioned to engage said driving pinion when the rod is in operating position, and to be moved out of engagement with said pinion when the rod is moved out of operating position.

8. An apparatus according to claim 2, said rods each having cam means near their rear ends rotatable with the rods to impart continuous axial reciprocation to the respective associated rod when in operating position.

9. An apparatus according to claim 2, each rod having a first gear wheel rotatable therewith and a second gear wheel rotatable relative thereto, a cam fixed to the rod, a second cam cooperating therewith and secured to said second gear wheel, a driving piston shiftable to engage either of said gear wheels of whichever rod is in operating position, and means for selectively locking each of said gear wheels against rotation, whereby the rod in operation may be caused to rotate continuously by engaging said pinion and said first gear wheel, to reciprocate and rotate continuously by engaging said pinion with said second gear, or to reciprocate without rotation by engaging the pinion with said second gear wheel and locking said first gear wheel against rotation.

10. An apparatus according to claim 1, a pair of jaws for supporting the rear part of said mandrel, and means for opening said jaws to permit the passage of a fresh length of tubing.

11. An apparatus for forming tubes of thermoplastic material with bores of accurate dimensions and fine quality finish comprising in combination, a supporting frame, a furnace for heating a length of thermoplastic tubing carried on said frame, means for feeding said tubing into said furnace and supported on said frame, means for drawing said tubing from said furnace and supported on said frame, means for driving said feeding and drawing means, variable speed gearing for regulating the relative speeds of said feeding and drawing means, a tubular mandrel extending into said furnace, a tubular mandrel rod extending rearwardly from said mandrel, a readily detachable coupling engaging said mandrel and said rod for providing a driving connection therebetween, and a joint between the bores thereof, an actuating member in operative connection with said mandrel rod to maintain said rod and said mandrel in continuous motion and a vacuum connection to the bore of said tubular mandrel operating rod.

12. An apparatus according to claim 2, said mandrel and said mandrel rods being tubular, a vacuum pump, means for connecting said vacuum pump to said rods, and a valve controlled by movement of said rod support for disconnecting from said pump all rods except the one in operating position.

13. An apparatus according to claim 11, a readily detachable gear wheel mountable on the rear end of said mandrel so as to rotate with the mandrel and to provide means for rotating the mandrel when no mandrel rod is coupled to the mandrel, said gear wheel being removable laterally from the mandrel to permit a fresh length of tube to be introduced onto the mandrel, and a vacuum connection readily connectable to the rear end of the mandrel to maintain reduced pressure in said tube under treatment when no operating rod is connected to said mandrel.

SAMUEL JAMES EVERETT.

REFERENCES CITED

The following references are of record in the file of this patent:

UNITED STATES PATENTS

| Number | Name | Date |
|---|---|---|
| 1,301,714 | Kueppers | Apr. 22, 1919 |
| 2,393,979 | Everett | Feb. 5, 1946 |
| 2,396,254 | Everett | Mar. 12, 1946 |

FOREIGN PATENTS

| Number | Country | Date |
|---|---|---|
| 339,503 | Germany | July 26, 1921 |
| 547,880 | Great Britain | Feb. 8, 1941 |